United States Patent
Crombez et al.

(10) Patent No.: US 9,539,993 B2
(45) Date of Patent: Jan. 10, 2017

(54) BY-WIRE FALLBACK BRAKING MODE FOR BRAKE-BY-WIRE SYSTEMS IN VEHICLES

(71) Applicant: Ford Global Technologies, LLC, Dearborn, MI (US)

(72) Inventors: Dale Scott Crombez, Livonia, MI (US); Timothy Jurkiw, Macomb, MI (US); Jerry Wayne Seal, II, Southgate, MI (US); Jinkoo Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/736,913

(22) Filed: Jun. 11, 2015

(65) Prior Publication Data
US 2016/0362095 A1    Dec. 15, 2016

(51) Int. Cl.
| B60T 13/66 | (2006.01) |
| B60T 7/04 | (2006.01) |
| B60T 8/40 | (2006.01) |
| B60T 13/74 | (2006.01) |

(52) U.S. Cl.
CPC .............. B60T 13/662 (2013.01); B60T 7/042 (2013.01); B60T 8/4081 (2013.01); B60T 13/745 (2013.01)

(58) Field of Classification Search
CPC .......... B60T 7/042; B60T 8/40; B60T 8/4072; B60T 8/4081; B60T 13/66; B60T 13/662; B60T 13/74; B60T 13/745
See application file for complete search history.

(56) References Cited

U.S. PATENT DOCUMENTS

| 6,161,904 | A * | 12/2000 | Schmidt | B60T 7/042 303/122.04 |
| 6,582,030 | B2 * | 6/2003 | Harris | B60T 7/042 303/15 |
| 6,588,855 | B2 * | 7/2003 | Harris | B60T 7/042 303/15 |
| 6,598,943 | B2 * | 7/2003 | Harris | B60T 7/042 303/113.4 |
| 6,824,228 | B2 * | 11/2004 | Harris | B60T 8/266 303/113.4 |
| 8,152,244 | B2 | 4/2012 | Yanai et al. | |
| 8,348,352 | B2 | 1/2013 | Nishino et al. | |
| 2004/0100146 | A1 * | 5/2004 | Giers | B60T 8/348 303/122 |
| 2011/0074207 | A1 * | 3/2011 | Arakawa | B60T 8/4077 303/10 |
| 2014/0225425 | A1 * | 8/2014 | Drumm | B60T 7/042 303/9.75 |

* cited by examiner

*Primary Examiner* — Thomas J Williams
(74) *Attorney, Agent, or Firm* — David B. Kelley; Brooks Kushman P.C.

(57) ABSTRACT

A vehicle includes a brake-by-wire system that delivers a certain amount of brake fluid pressure to wheel brakes depending upon the position of a brake pedal. A brake-by-wire fallback or backup mode of operation is also provided. When activated, this by-wire fallback mode commands a certain, known magnitude of brake pressure. The commanded amount of brake pressure can vary based on the state of a brake pedal on/off switch, and can be set regardless of brake pedal position. This provides a backup to the brake-by-wire system without necessarily requiring a mechanical push-through backup system to brake the vehicle in the event a backup mode is required.

18 Claims, 4 Drawing Sheets

BY-WIRE FALLBACK BRAKING MODE FOR BRAKE-BY-WIRE SYSTEMS IN VEHICLES

TECHNICAL FIELD

This disclosure generally relates to brake-by-wire systems in a vehicle. More particularly, this disclosure relates to an enhanced by-wire braking mode or add-on feature that acts as a fallback to brake-by-wire systems.

BACKGROUND

Hydraulic braking systems are equipped in the majority of all passenger vehicles in the market. In a hydraulic braking system, a brake pedal is mechanically coupled to master cylinder that delivers pressurized fluid to wheel brakes as the brake pedal is depressed. A vacuum booster can also assist the movement of the brake pedal to reduce the brake pedal application force necessary to deliver hydraulic fluid to the brakes.

A brake-by-wire system is a brake actuation system in which the brake pressure generation is mechanically decoupled from the brake pedal. A brake-by-wire system may use a sensor to determine position of the brake pedal, pedal application pressure, or both. The brake pedal position is processed by an appropriate controller to generate a corresponding braking request. The braking request is used to control an associated actuator which applies hydraulic/pneumatic or electric signals to wheel brake devices. As there is no direct mechanical connection between the brake pedal and the wheel brake devices, the braking controller may determine an appropriate amount of braking torque to be applied to the wheels of the vehicle based upon the position of the brake pedal.

Vehicles equipped with brake-by-wire systems can also have a hydraulic braking system as a backup to the by-wire system. In direct response to an inability to detect the driver's braking demands, a "push-through" mechanical hydraulic braking mode can be activated in which hydraulic pressures are applied to the braking devices by means similar to conventional hydraulic braking systems.

SUMMARY

According to one embodiment, a vehicle comprises a brake-by-wire system and a mechanical push-through system. The brake-by-wire system is configured to transmit a brake force to wheel brakes based on signals from a brake pedal position sensor. The mechanical push-through system is configured to transmit hydraulic pressure from a master cylinder. The vehicle includes at least one controller programmed to, in response to signal loss from the brake pedal position sensor, command a predetermined magnitude of the brake force while inhibiting activation of the mechanical push-through system. This enables a by-wire fallback or backup braking system rather than a mechanical hydraulic backup braking system, when conditions dictate so.

According to another embodiment, a brake-by-wire system for a vehicle is provided. The system includes a brake pedal configured to cause a brake force to be transmitted to wheel brakes. A brake pedal position sensor is configured to detect a magnitude of brake pedal depression. At least one controller is programmed to, in response to signal loss from the brake pedal position sensor, command a predetermined magnitude of the brake force.

In yet another embodiment, a method of controlling a brake-by-wire system in a vehicle is provided. The method includes supplying an amount of brake force to wheel brakes based on brake pedal position as indicated by a brake pedal position sensor. Then, in response to signal loss from the brake pedal position sensor, the brake force is increased to a predetermined magnitude that changes according to a change in state of a brake pedal on/off switch. Thus, when a brake pedal position sensor loses signal, the brake force increases to a predetermined magnitude. This predetermined magnitude can depend upon the state of the brake pedal on/off switch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A brake-by-wire control strategy may use a sensor to determine position of the brake pedal, pedal effort (pressure), or both. The brake pedal position is processed by an appropriate controller to generate a corresponding braking request depending upon the particular operating conditions of the vehicle. The braking request is used to control an associated actuator which applies hydraulic/pneumatic or electric signals to the braking device(s) to effect braking of the vehicle. In brake-by-wire systems, there is typically no direct mechanical or fluid coupling between the brake pedal and the actual braking devices. As such, the braking controller may determine an appropriate amount of braking torque to be applied to one or more wheels of the vehicle based upon the position of the brake pedal and the current operating conditions of the vehicle.

Figure 1:
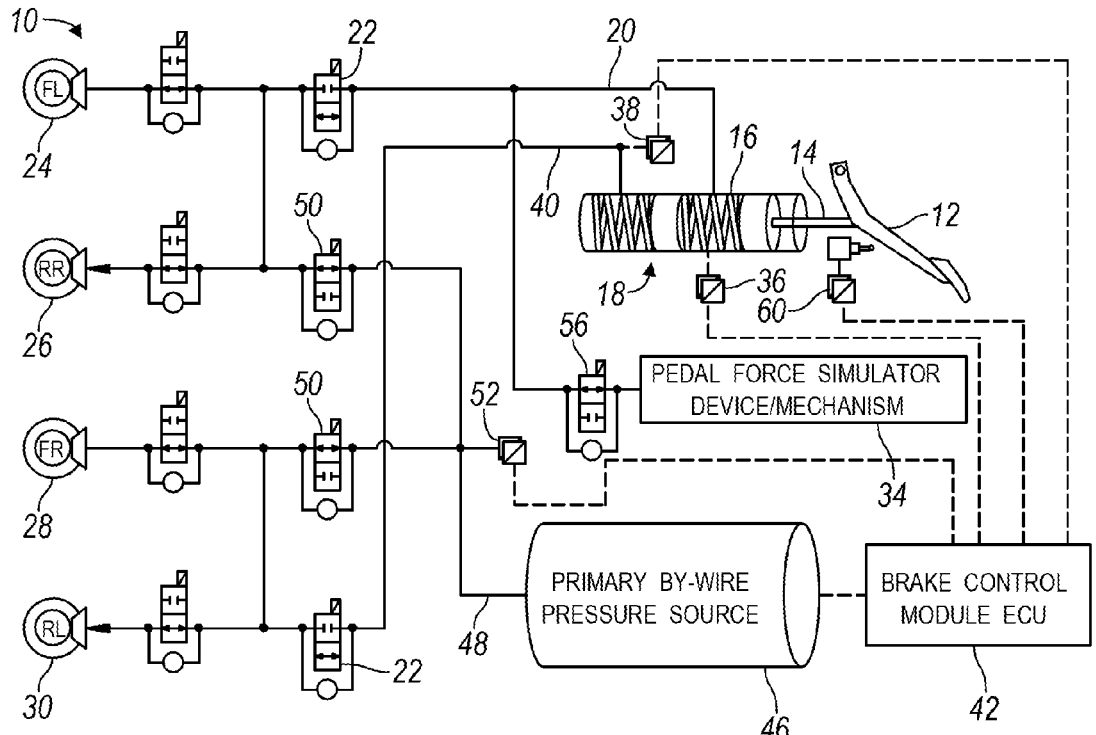
FIG. 1 is a schematic of a vehicle brake-by-wire system with a mechanical, hydraulic backup system.

Referring to FIG. 1, a brake-by-wire system with a mechanical, hydraulic backup is illustrated at 10.

First, the structure and operation of the brake-by-wire system will be described. A brake pedal 12 is provided. Depression of the brake pedal 12 translates into pressurization of hydraulic fluid, indicating driver demanded brake power. To do so, the brake pedal 12 is coupled to an input rod 14 that depresses plungers 16 within a master cylinder 18. The master cylinder 18 illustrated is a conventional tandem master cylinder (TMC) with two plungers mechanically linked; however, other master cylinders may be used as known methods of converting brake pedal depression into hydraulic fluid movement. Also, while not shown in FIG. 1, a vacuum booster may also be provided to assist movement of the brake pedal.

Depression of the brake pedal 12 causes the fluid to move along line 20. However, because the vehicle is operating in the brake-by-wire mode, valves 22 are closed, thereby inhibiting the brake fluid from activating the wheel brakes 24, 26, 28, 30. Since the brake-by-wire system may not have hydraulic pressure at the brake pedal 12 from conventional hydraulic means, a pedal force simulator device 34 is illustrated to provide a force back to the pedal 12. The simulation force provided by the simulator 34 acts opposite the brake pedal force generated by the vehicle operator. This force may be provided by an electronic actuator, a spring, or the like.

Instead of the pressurized hydraulic fluid in line 20 providing the brake force, the brake-by-wire system generates a brake force based on sensing of the driver's brake pedal input by sensors 36, 38. Sensor 36 is a master cylinder input rod travel sensor that senses the longitudinal distance the rod 14 travels during brake pedal application. Sensor 38 is a master cylinder pressure output sensor configured to detect the fluid pressure in line 40. These sensors 36, 38 are electrically coupled to at least one controller 42, such as a brake electronic control module (BECM) or other electronic control unit (ECU). It should be understood that the phrase "controller" should not be limited to either of these two types of controllers, but can be any controller with a processor configured to read electronic signals from the sensors 36, 38 and provide corresponding commands based on those signals.

During a braking event, the controller 42 receives signals indicative of fluid pressure in the line 40 as well as input rod 14 displacement. Based on these signals, the controller 42 commands a primary by-wire pressure source, or brake power source 46, to supply brake power to wheel brakes 24, 26, 28, 30. The brake power source 46 may be a pump with an associated pressure reservoir to supply fluid to line 48, through open valves 50, and to the wheel brakes. Alternatively, the brake power source 46 may be an electromechanically-actuated hydraulic piston to supply the fluid. A by-wire pressure source pressure sensor 52 provides feedback to the controller 42 as to the pressure in line 48 for feedback control of the brake power source 46. Other embodiments are contemplated in which the brake power source 46 may be other electromechanical devices capable of braking the wheels by means separate from the hydraulic actuation from the master cylinder 18.

Each of the valves 22, 50 can be controlled by controller 42 or another controller. The system illustrated in FIG. 1 shows valves 22 closed and valves 50 open. This allows the system to operate in the brake-by-wire mode.

Figure 2:
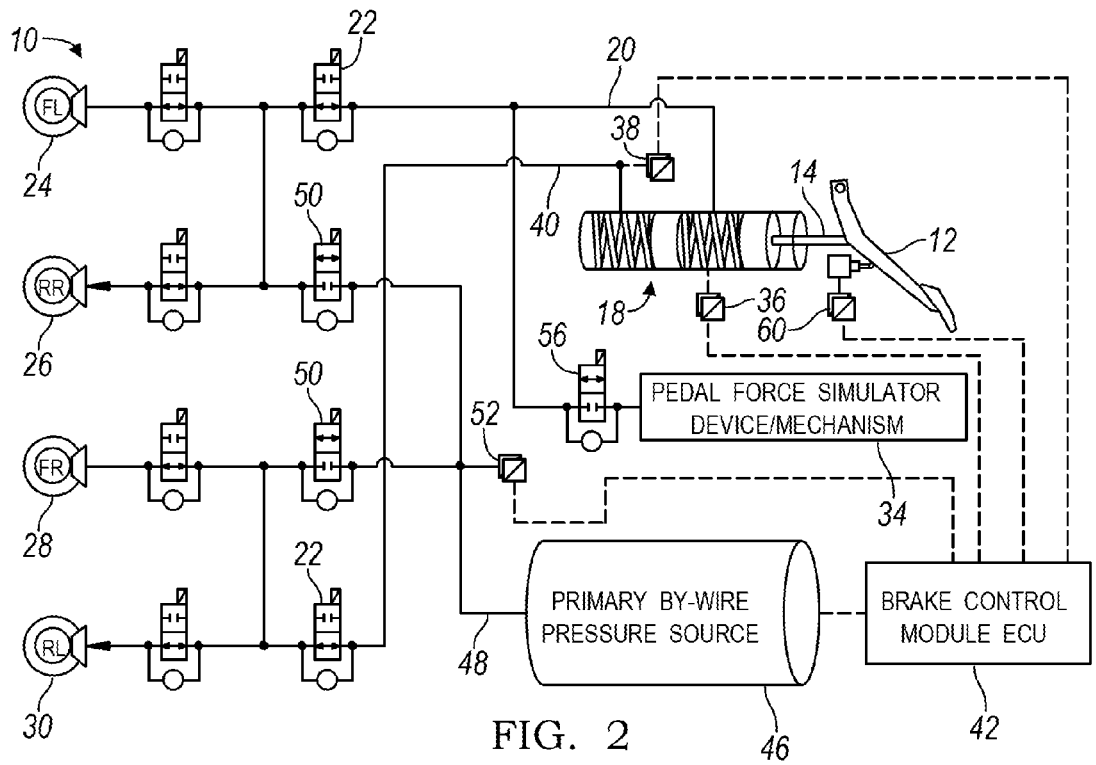
FIG. 2 is a schematic of a vehicle brake-by-wire system with a by-wire backup system, according to one embodiment.

Referring to FIG. 2, the brake-by-wire mode is disabled and a mechanical hydraulic fallback mode is illustrated. This mechanical hydraulic system is also known as a mechanical "push-through" system. A mechanical hydraulic backup system is provided for the brake-by-wire system in case of a degradation in signal or loss of signal from the sensors 36, 38 that would affect the operation of the brake power source 46, or a degradation or loss of the brake power source 46 itself. For example, the controller 42 is programmed to detect an absence, irregularity, or degradation in signal from each of the sensors shown, including sensors 36 and 38. In response to this detection, the controller can activate the push-through system as a fallback to the brake-by-wire system. When the push-through system is operational, controller 42 causes the valves 22 to open and the valves 50 to close. Opening of the valves 22 enables the hydraulic fluid from the master cylinder 18 to travel to the wheel brakes 24, 26, 28, 30 through fluid lines 20 and 40. And, closing of the valves 50 inhibits fluid from the brake power source 46 from traveling to the wheel brakes 24, 26, 28, 30 through fluid line 48. Thus, during the push-through mode, the hydraulic push-through system provides hydraulic braking from the master cylinder and deactivates the by-wire braking.

Sizing of the foundation brakes as well as the master cylinder 18 become critical factors in determining the output capability and pedal force feedback that the driver will experience in this push-through mode. Braking forces from the push-through system may not feel as adequate or identical to the braking forces in the by-wire system. In general, usage of the push-through fallback braking system is limited due to the differences in both braking output for a given brake pedal travel, and feedback to the driver for a given pedal force input, particularly for the conditions in which the driver demand can no longer be determined. Depending on the electronic brake booster system design, there may be an increased likelihood of no longer being able to determine driver demand due to sensor availability and configurations.

Therefore, according to the present disclosure, a by-wire fallback braking mode is provided that can limit the necessity of transitioning into a complete mechanical push-through fallback braking mode in the event of a degradation in or signal loss from the brake-by-wire sensors. As will be described below, this by-wire fallback braking mode can be enabled instead of the mechanical push-through, hydraulic fallback mode shown in FIG. 2.

According to various embodiments of the present disclosure, when conditions occur that would normally trigger the push-through fallback system to activate instead of the by-wire braking system (as described above), the controller can activate an enhanced brake-by-wire fallback braking mode. Referring back to FIG. 1, when the by-wire fallback braking mode is active, the valves 22, 50 can remain in their normal state during by-wire braking. In other words, during the by-wire fallback braking mode, the braking system can remain in a by-wire mode.

In this by-wire fallback braking mode, the brake system can utilize an available external brake pedal application indication device, such as a brake on/off switch 60. The brake on/off switch 60 is configured to detect when the brake pedal is depressed. A signal generated from this on/off switch 60 has other uses, such as activation of the brake lights at the rear of the vehicle. The by-wire fallback braking system can implement two stages of by-wire brake pressure output based on the status of this brake on/off switch 60.

When the brake pedal 12 is not depressed during the by-wire fallback braking mode, a constant output of overall braking power can be provided by the brake power source 46 to the wheel brakes. The total amount of braking sent to the wheel brakes may include regenerative braking, if equipped in the vehicle. A first predetermined magnitude of brake force ($K_{enh\_bbw\_fbck\_low}$) can be set to an amount that would provide additional off-pedal deceleration in addition to any engine braking or foot-off-brake regenerative braking. The controller can continue to monitor the temperature of the wheel brakes 24, 26, 28, 30, and, based on the temperature exceeding a threshold, the controller can command the mechanical hydraulic fallback brake mode (shown in FIG. 2) to activate. In one embodiment, the controller can command the hydraulic fallback brake mode to activate when the wheel brakes have exceeded a threshold for a certain period of time driving with the foot off the brake.

When the brake pedal 12 is depressed during the by-wire fallback braking mode, a second predetermined magnitude of brake force ($K_{enh\_bbw\_fbck\_high}$) can be commanded by the controller 42 to be output by the brake power source 46. This predetermined magnitude can be an amount of torque that would yield an equivalent level of deceleration that is greater than or equal to the deceleration capability of the mechanical push-through fallback brake mode at the given brake pedal force input. This predetermined magnitude can also be rate-limited or filtered so that it applies smoothly instead of the output being binary in nature. If the rate-limit or filter is applied, the rate-limit or filter can be time-dependent in which a counter is started at the time the brake on/off switch 60 indicates the brake pedal 12 being depressed. After a calibratable time period of continued brake pedal application, the rate-limit or filter can increase to achieve a target level of deceleration more quickly. The level of output can then continue until either the brake pedal is released (as determined by the brake on/off switch 60), or the vehicle is confirmed to have stopped and reached a speed of 0 mph.

Once the vehicle is confirmed to have stopped, this controller 42 can hand over the control of the braking to an existing autohold feature (if available) to manage the vehicle at standstill. In the absence of autohold, the controller 42 can command the brake power source 46 to output a zero-speed brake pressure output ($K_{enh\_bbw\_fbck\_zspd}$). This predetermined brake pressure output can be utilized when the vehicle is at standstill with the brake pedal 12 applied. This predetermined brake pressure output ($K_{enh\_bbw\_fbck\_zspd}$) can be dynamic and variable based on the gradient and mass of the vehicle such that the brake power source 46 outputs brake power capable of maintaining the vehicle in the standstill position.

Figure 3:
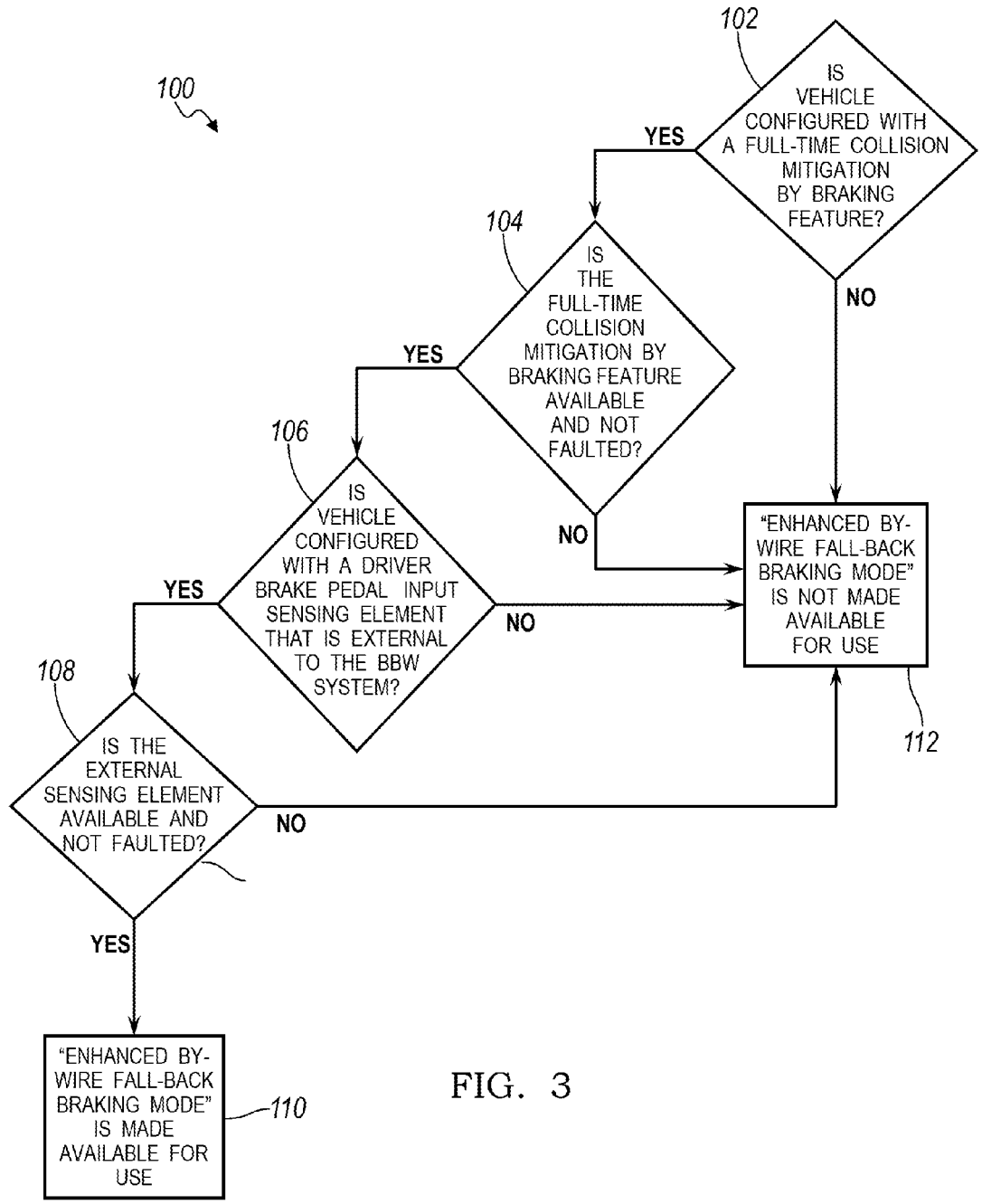
FIG. 3 is a flow chart illustrating a method of determining whether a by-wire backup braking mode is available for use, according to one embodiment.
Figure 4:
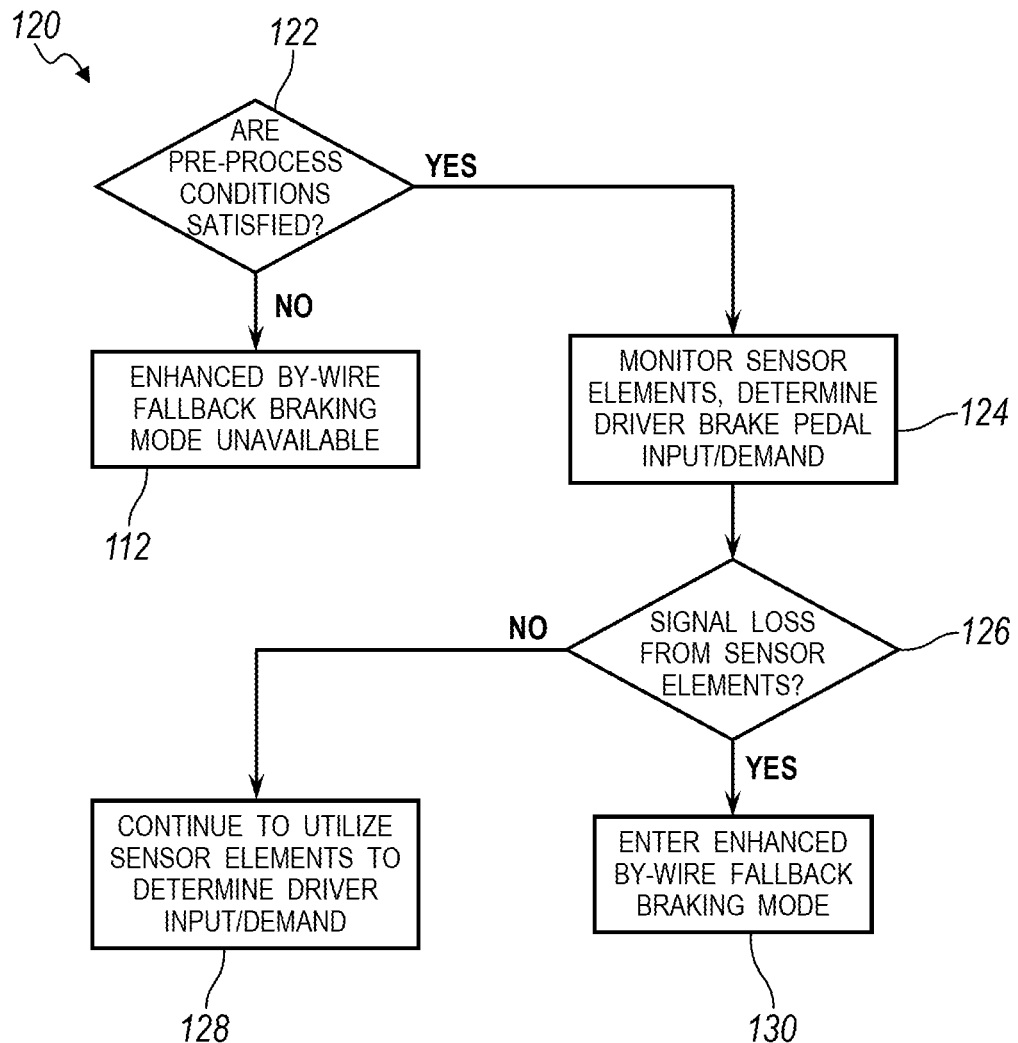
FIG. 4 is a flow chart illustrating a method of deciding whether to enter the by-wire backup braking mode, according to one embodiment.
Figure 5:
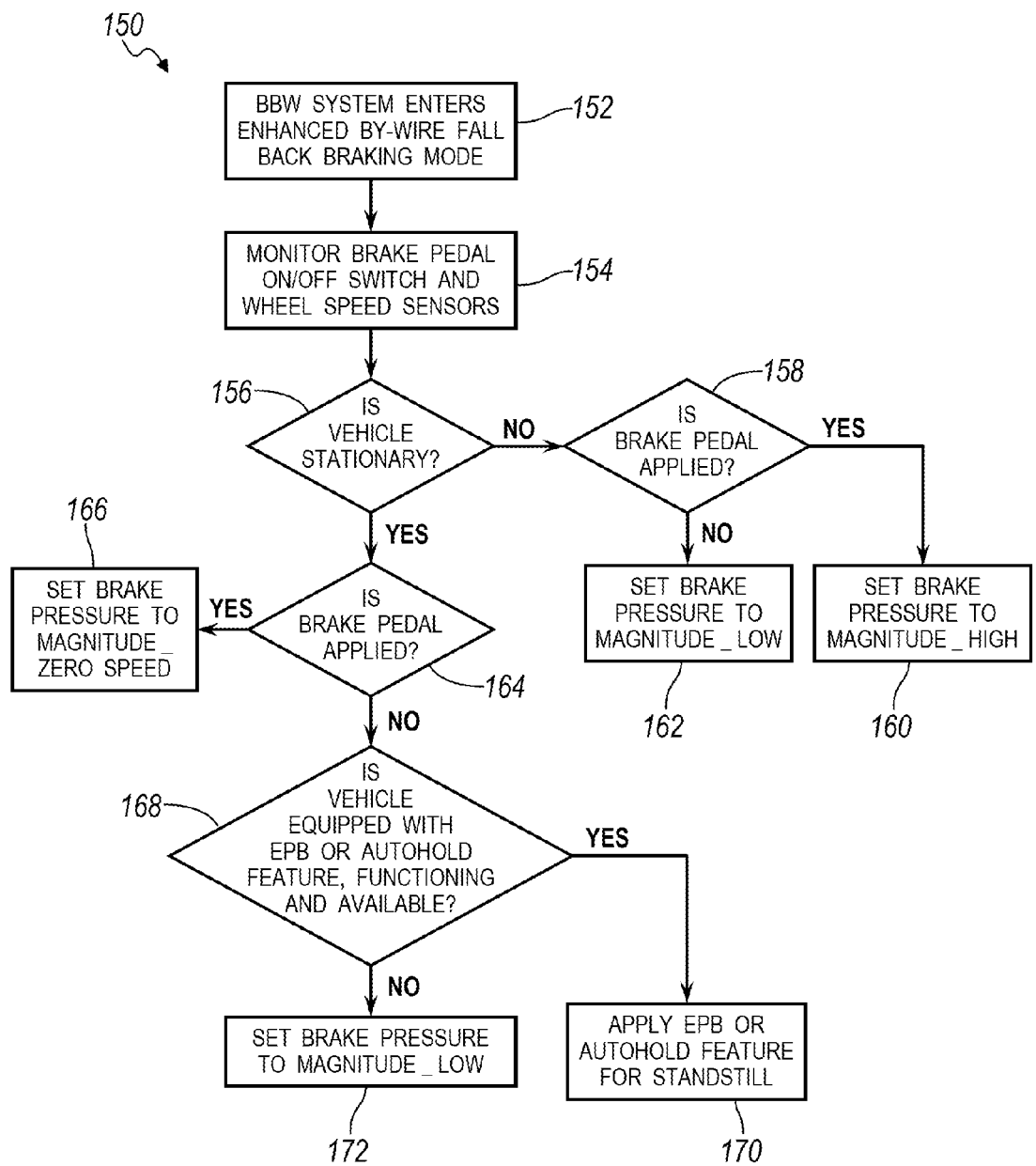
FIG. 5 is a flow chart illustrating a method of controlling the by-wire backup system and brake pressures associated therewith, according to one embodiment.

The strategy of selecting what brake pressure to be output by the brake power source 46 during the by-wire fallback braking mode is illustrated in FIGS. 3-5, explained below.

Referring to FIG. 3, a flow chart illustrates a control strategy to first assure that the by-wire fallback braking can be utilized by the vehicle. If any of the decisions made at steps 102, 104, 106, or 108 yield a "no," then the enhanced by-wire braking fallback control strategy is not made available for use. At 102, a decision is made as to whether the vehicle is configured with a full-time collision mitigation by braking feature. Automatic collision mitigation systems are known in the art, and include sensing the surroundings of the vehicle, including other vehicles, and automatically applying the brakes in response to the vehicle approaching another vehicle. In some embodiments, the vehicle having one of these systems may be a prerequisite to having the by-wire fallback braking mode, as the collision mitigation by braking functions can step in to request a higher level of deceleration than the equivalent brake force $K_{enh\_bbw\_fbck\_high}$ in the event that the by-wire fallback braking is unable to slow the vehicle enough from the approaching obstacle.

At 104, a decision is made as to whether the full-time collision mitigation by braking feature is available and not faulted. In other words, one or more controllers can determine that there are no faults in the collision mitigation system. At 106, a decision is made as to whether the vehicle is equipped with a brake pedal input sensing element that is external to the brake-by-wire system. Such a brake pedal input sensing element is exemplified in FIGS. 1-2 as a brake on/off switch 60. At 108, a decision is made as to whether the external brake pedal input sensing element is available and not faulted.

If each of the decisions at 102, 104, 106, 108 yields an affirmative answer, then the enhanced by-wire fallback braking mode described above is made available for use by the vehicle, as shown at 110. Alternatively, if any of the decisions at 102, 104, 106, 108 yields a negative answer, then the enhanced by-wire fallback braking mode is not made available for use by the vehicle, as shown at 112.

Referring to FIG. 4, another flow chart is provided, illustrating a control strategy 120 to determine whether the by-wire fallback braking mode should be activated. This control strategy 120 is entered only upon a positive determination at 122 that the pre-process conditions of FIG. 3 are satisfied, i.e., if affirmative decisions were made at 102, 104, 106 and 108 to lead to the enhanced by-wire fallback braking mode being available for use at 110.

If the by-wire fallback braking mode is available, the controller monitors the signals at 124 from the sensor elements 36, 38, which provided information indicative of travel distance of the input rod and fluid pressure, as described above. At 126, during constant monitoring of the sensors 36, 38, the controller will determine whether there is a loss of signal from either sensor 36, 38. Rather than a complete loss of signal, the controller can also be configured to determine whether a degradation of signal from these sensors is present. Such a degradation in signal can include receiving signals from the sensors 36, 38 that are below a threshold that would indicate a malfunction of the sensor or the signals being sent therefrom.

If there is no signal loss as determined at 126, the system continues to utilize the sensors 36, 38 to determine driver input and demand, and produces standard by-wire braking accordingly at 128. If, however, there is a signal loss from one or both of the sensors 36, 38 that would impair the ability to properly interpret driver demand and produce accurate by-wire braking, the enhanced by-wire fallback braking mode is commanded and utilized according to the by-wire fallback braking described above.

Referring to FIG. 5, a control strategy 150 is illustrated that operates the by-wire fallback braking based on the status of the brake pedal on/off switch. Step 152 illustrates that the system is operating in the by-wire fallback braking mode, as described above. At 154, the controller continues to monitor the signals sent from the brake pedal on/off switch 60. The controller (or another controller) also monitors the wheel speed sensors such that the control system can determine whether the vehicle is stationary at 156.

If the vehicle is not stationary, the controller determines at 158 whether the brake pedal is applied based on signals received from the brake pedal on/off switch 60 as monitored at 154. If the brake pedal is applied, the by-wire fallback braking system commands the primary by-wire pressure source 46 to output brake pressure at a high magnitude at 160 to produce a high magnitude of brake force ($K_{enh\_bbw\_fbck\_high}$), described above. If, alternatively, the brake pedal is not applied while the vehicle is not stationary, the controller commands the pressure source 46 to output brake pressure at a lower magnitude at 162 to produce a lower magnitude of brake force ($K_{enh\_bbw\_fbck\_low}$), described above.

Referring back to step 156, if it is determined that the vehicle is in fact stationary, the controller once again determines whether the brake pedal is applied at 164. If the brake pedal is applied, then the controller commands the by-wire pressure source 46 to produce pressure at a zero-speed magnitude at 166 to produce a zero-speed brake pressure output ($K_{enh\_bbw\_fbck\_zspd}$), described above.

If the brake pedal is not applied at 164, then the controller determines whether the vehicle is equipped with a functioning, available electronic parking brake (EPB) or autohold feature at 168. If such a feature is functioning and available, the controller commands the EPB or autohold feature to operate accordingly to maintain the vehicle stationary and standstill at 170. If, however, such a feature is either not available or is not functioning or unable to function properly, the controller commands the by-wire pressure source 46 to produce pressure at the low magnitude at 172 to produce a lower magnitude of brake force ($K_{enh\_bbw\_fbck\_low}$), described above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
a brake-by-wire system configured to transmit a brake force to wheel brakes based on signals from a brake pedal position sensor;
a mechanical push-through system configured to transmit hydraulic pressure from a master cylinder; and
at least one controller programmed to, in response to signal loss from the brake pedal position sensor during brake-by-wire system operation, maintaining brake-by-wire system operations while commanding a predetermined magnitude of the brake force and inhibiting activation of the mechanical push-through system;
wherein the at least one controller is further programmed to activate the mechanical push-through system in response to a temperature of the wheel brakes exceeding a threshold.

2. The vehicle of claim 1, further comprising a brake pedal on/off switch configured to indicate whether a brake pedal is being applied, wherein the predetermined magnitude changes in response to a change in state of the brake pedal on/off switch from off to on.

3. The vehicle of claim 2, wherein the predetermined magnitude is a magnitude of torque at least equal to a torque capability of the mechanical push-through system.

4. The vehicle of claim 2, wherein the at least one controller is further programmed to activate the mechanical push-through system in response to signal loss from the brake pedal on/off switch.

5. The vehicle of claim 1, further comprising a brake pedal on/off switch configured to indicate whether a brake pedal is being applied, wherein the predetermined magnitude is constant in response to the brake pedal on/off switch indicating non-application of the brake pedal.

6. A brake-by-wire (BBW) system for a vehicle, comprising:
a brake pedal configured to cause a brake force to be transmitted to four wheel brakes;
a brake pedal position sensor configured to detect a magnitude of brake pedal depression; and
a controller programmed to, in response to signal loss from the brake pedal position sensor during BBW system operation, maintain BBW system operation at the wheel brakes while commanding a predetermined magnitude of the brake force.

7. The system of claim 6, wherein the at least one controller is further programmed to inhibit activation of a mechanical push-through system while commanding the predetermined magnitude of the brake force.

8. The system of claim 6, further comprising a brake pedal on/off switch configured to indicate whether a brake pedal is being applied, wherein the predetermined magnitude changes in response to a change in state of the brake pedal on/off switch from off to on.

9. The system of claim 8, further comprising a brake pedal on/off switch configured to indicate whether a brake pedal is being applied, wherein the predetermined magnitude is constant in response to the brake pedal on/off switch indicating non-application of the brake pedal.

10. The system of claim 9, wherein the at least one controller is further programmed to activate a mechanical push-through hydraulic brake system in response to a temperature of the wheel brakes exceeding a threshold.

11. The system of claim 8, wherein the at least one controller is further programmed to activate a mechanical push-through hydraulic brake system in response to signal loss from the brake pedal on/off switch.

12. A method of controlling a brake-by-wire (BBW) system in a vehicle, comprising:
   supplying a BBW brake force to four wheel brakes based on brake pedal position as indicated by a brake pedal position sensor; and
   in response to signal loss from the sensor during BBW operation, increasing the BBW brake force at the wheels to a predetermined magnitude that changes according to a change in state of a brake pedal on/off switch.

13. The method of claim 12, further comprising inhibiting a mechanical hydraulic push-through system during the maintaining and increasing.

14. The method of claim 12, wherein the predetermined magnitude changes in response to a change in state of the brake pedal on/off switch from off to on.

15. The method of claim 12, wherein the predetermined magnitude is constant in response to the brake pedal on/off switch indicating non-application of the brake pedal.

16. The method of claim 15, further comprising activating a mechanical hydraulic push-through system in response to a temperature of the wheel brakes exceeding a threshold.

17. The method of claim 12, wherein the predetermined magnitude is a magnitude of torque at least equal to a torque capability of a corresponding mechanical hydraulic push-through system.

18. The method of claim 12, wherein the predetermined magnitude is a magnitude of torque configured to maintain the wheels motionless based on the wheels being motionless when the signal loss occurs.

* * * * *